(12) United States Patent
Fein et al.

(10) Patent No.: US 8,850,180 B2
(45) Date of Patent: Sep. 30, 2014

(54) SECURE DATA COMMUNICATION SYSTEM (75) Inventors: Gene Fein, Malibu, CA (US); Edward Merritt, Lenox, MA (US)

(73) Assignee: Empire Technology Development, LLC, Wilmington, DE (US)

( * ) Notice: Subject to any disclaimer, the term of this patent is extended or adjusted under 35 U.S.C. 154(b) by 1005 days.

(21) Appl. No.: 12/201,298

(22) Filed: Aug. 29, 2008

(65) Prior Publication Data

US 2010/0058049 A1    Mar. 4, 2010

(51) Int. Cl.
*H04L 29/06* (2006.01)
*H04L 29/08* (2006.01)
*H04L 25/14* (2006.01)

(52) U.S. Cl.
CPC .......... *H04L 29/08774* (2013.01); *H04L 63/04* (2013.01); *H04L 25/14* (2013.01)
USPC ........... 713/150; 709/223; 709/225; 709/219; 709/231; 709/235; 707/E17.032; 726/4

(58) Field of Classification Search
CPC .... H04L 29/08774; H04L 63/04; H04L 25/14
USPC ........ 726/4, 26; 709/223, 225, 219, 235, 231; 707/E17.032
See application file for complete search history.

(56) References Cited

U.S. PATENT DOCUMENTS

| | | | |
|---|---|---|---|
| 7,085,843 B2 * | 8/2006 | Buddhikot et al. | 709/231 |
| 2002/0083047 A1 * | 6/2002 | Suzuki et al. | 707/1 |
| 2003/0217138 A1 * | 11/2003 | Shimba et al. | 709/223 |
| 2008/0289006 A1 * | 11/2008 | Hock et al. | 726/4 |
| 2009/0106441 A1 * | 4/2009 | Zuckerman et al. | 709/231 |
| 2009/0313364 A1 * | 12/2009 | Parsons et al. | 709/223 |
| 2010/0094955 A1 * | 4/2010 | Zuckerman et al. | 709/219 |

* cited by examiner

*Primary Examiner* — Arvin Eskandarnia
(74) *Attorney, Agent, or Firm* — Moritt Hock & Hamroff LLP; Steven S. Rubin, Esq.

(57) ABSTRACT

The description relates to a system designed to protect data exchange involved with the use of cloud computing infrastructures by services and individuals. The system is designed so that a cloud resource and its middleware access points are protected in transferring data among themselves and end users using a system designed to spread the data and then reassemble the data.

20 Claims, 9 Drawing Sheets

SECURE DATA COMMUNICATION SYSTEM

TECHNICAL FIELD

This disclosure relates to the area of network computing security, and more specifically to the area of secure transmission and storage of data over a network.

BACKGROUND INFORMATION

It is well known that ways to secure the transfer of electronic data are a priority for businesses, governments, organizations, educational institutions and individuals. In today's online computing and data environment the security of data is under constant assault from hackers and system interlopers. Technologists and hackers are equally knowledgeable about many schemes for data security, such as encryption and filtering.

With access to supercomputing network resources opening up combined with the potential powerful data emanating from the supercomputing systems, it is more imperative than ever to create systems that protect both the data generated from those systems as well as the systems themselves from attack.

Unfortunately, an adequate solution that addresses these issues has eluded those skilled in the art, until now.

SUMMARY

In accordance with one aspect, a solution that handles data between middleware servers and clients to prevent data from being accessed by an unauthorized user is disclosed. The use of a supercomputing or "cloud computing" resource is employed with middleware to handle data transferred to and from the middleware. The data transactions between the middleware & the supercomputer may also be handled to protect the data in a similar fashion to that in which the data is handled between the middleware and the end user. As the data is received from the Cloud computing resource, the middleware organizes the data with orderly & efficient packaging of responses securely delivered to end user devices.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

It should be noted that the embodiments illustrated in these figures are representative only, and are not exclusive of all the embodiments that may implement a secure data transmission system using a cloud computing infrastructure.

DETAILED DESCRIPTION OF ILLUSTRATIVE EMBODIMENTS

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs and systems related to a secure data transmission system.

Implementations of packet storage transfer provide information from a single server, break up the information into packets and then send the packets to different servers. The information can be reassembled using a software formula or "recipe." The information recipe to reassemble using the system's custom algorithm that broke up the data may be used essentially in reverse to reassemble the information. This method allows for secure data storage with little knowledge by the storing component as to what the data may actually be until it is joined together by the program summoning and reassembling the data. The data servers and hard drives may be located all over the world. They are joined together by the storage application and the network itself.

A system is described that provides a secure mechanism for transmitting data between a client and a "cloud computing" infrastructure. Briefly described, the embodiments secure the data by fragmenting the data and transmitting the fragmented data between the client and middleware servers. Certain preferred embodiments of one such system are illustrated in the figures and described below. Many other embodiments are also possible, however time and space limitations prevent including an exhaustive list of those embodiments in one document. Accordingly, other embodiments within the scope of the claims will become apparent to those skilled in the art from the teachings of this patent.

Figure 1:
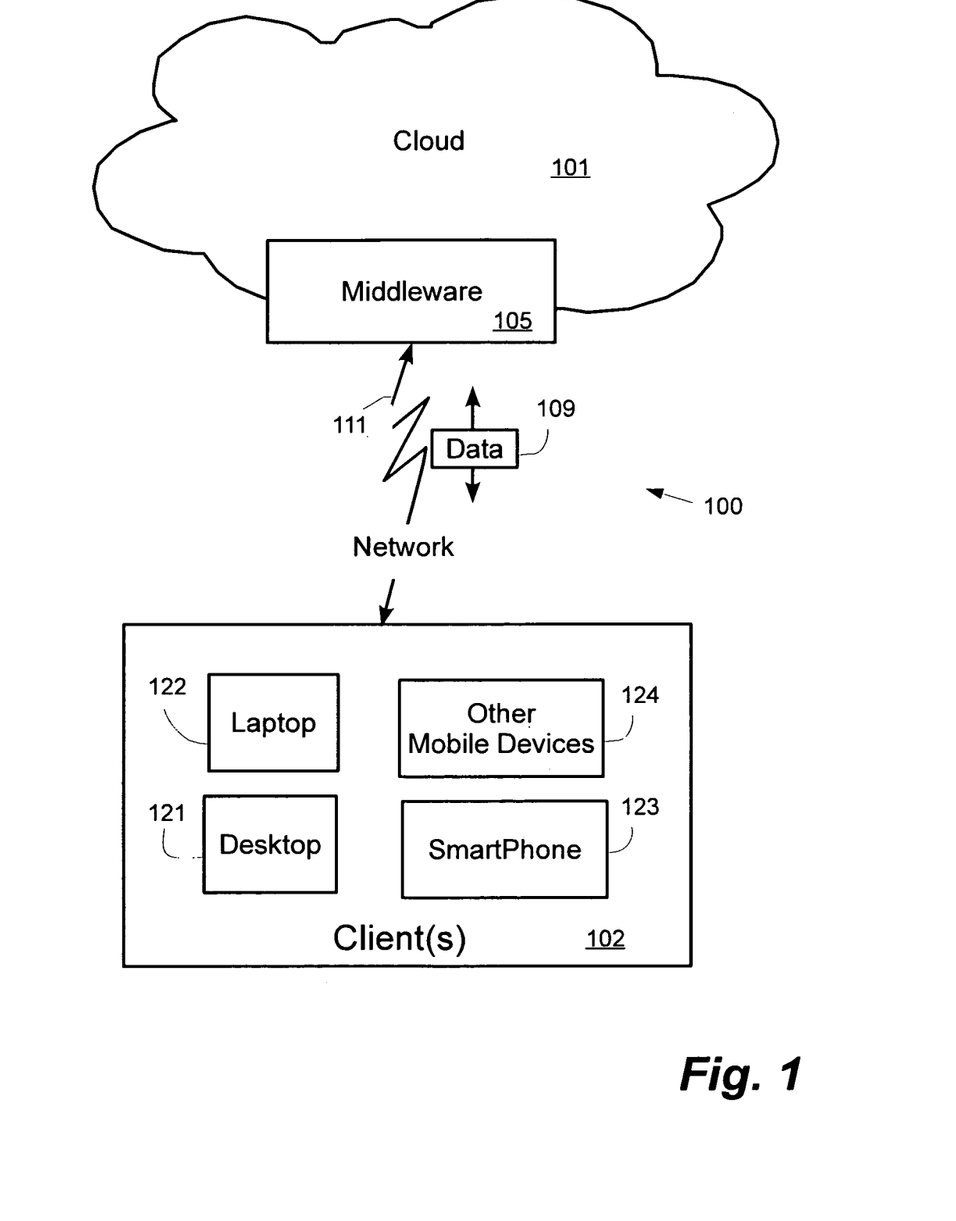
FIG. 1 is a functional block diagram of a computing environment implementing one embodiment of a system for secure data communication using a cloud computing infrastructure.

FIG. 1 is a functional block diagram of a computing environment 100 implementing one embodiment of a system for secure data communication between a client and a cloud computing infrastructure. As shown, one or more clients communicate with a multi-resource computing infrastructure (a "cloud" 101) over a network 111. The communication involves data transfer between the client 102 and the cloud 101, through a "middleware" server 105.

The cloud 101 is described in greater detail below in conjunction with FIG. 2. Briefly described, the cloud 101 is a cluster computing infrastructure available over the network 111. The cloud 101 includes multiple computing systems interconnected, generally over a local area network, to perform computing tasks collaboratively. The cloud 101 offers vastly superior computing functionality over conventional computing devices. Frequently, cloud computing is used to move the processing of certain applications off of many individual, independent computing devices to a centralized processing location, which simplifies the administration of those applications. In addition, frequently the users of the many individual, independent computing devices experience superior performance as the cloud 101 offers access to an aggregate of computing power that is vastly superior to the local computing power of the individual, independent computing devices.

The client 102 is a computing device which a user may use to interact with or perform tasks using the cloud 101. The client 102 is described in greater detail below in conjunction with FIG. 4. Briefly described, the client 102 may be any computing device, either mobile or fixed, that interacts with the cloud 101 over the network 101. Several examples of the client 102 include a desktop computer 121, a laptop computer 122, a smartphone 123, or any other mobile device 124.

The middleware server 105 is another computing system specially configured to administer at least certain data transfers between the client 102 and the cloud 101. One particular implementation of the middleware server 105 is described in greater detail below in conjunction with FIG. 3. Briefly described, the middleware server 105 includes one or more computing systems that handle security for data transmissions between the client 102 and the cloud 101 using the network 111.

Generally stated, in operation data transferred from the client 102 to the cloud 101 is delivered to the middleware 105. A splitter component of the client 102 divides the data into fragments according to certain security logic. Each of those fragments is then delivered to a different storage component of the middleware server 105, such as a different file server. The several fragments are stored separately so that the complete set of data 109 does not reside in one physical location at the middleware 105 or in the cloud 101.

In reverse, when the data 109 is requested by the client 102, the middleware 105 causes each of the several storage components (e.g., file servers) to independently transmit their data fragments to the client 102, where a joiner component on the client 102 reconstructs the data for local use.

Figure 2:
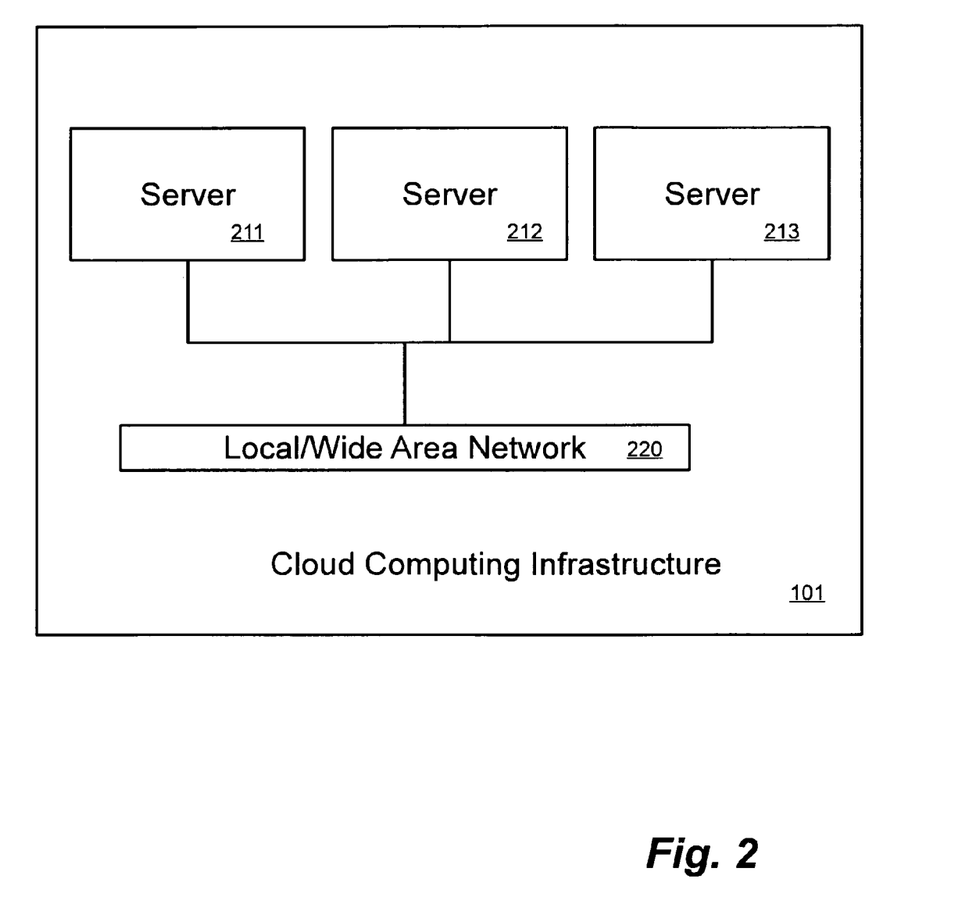
FIG. 2 is a functional block diagram illustrating in greater detail the cloud computing infrastructure introduced in conjunction with FIG. 1.

FIG. 2 is a functional block diagram illustrating additional features of the cloud computing infrastructure (cloud 101) introduced in conjunction with FIG. 1. In essence, the cloud 101 is a cluster computing environment including multiple computers interconnected to operate together as one logical unit, in terms of computing power, data storage, or both. As illustrated in FIG. 2, the cloud 101 includes multiple computing devices (computing devices 211-213). The multiple computing devices are interconnected with a local area and/or a wide area network 220.

As hardware costs drop, cluster computing technologies have become a viable option for carrying out complex systems by running several computers in parallel. The cluster generally includes several computers, working simultaneously to act as a single unit, automatically distributing tasks between the constituent nodes (e.g., computing devices 211-213). Cloud computing architectures are often used to solve particularly intensive computational problems. Due to their high cost of construction and operation, these systems have been relatively inaccessible to consumers until now. In addition, a significant limiting factor has been that effective use of computer clusters often requires special software narrowly tailored to the specific problem at hand.

As the associated costs drop, computers arranged in a cloud architecture can also function as servers for web applications, replacing the widespread, but relatively inefficient client/server architecture. Typical applications include e-mail, remote databases, gaming, and advertising. Alternatively, the cloud architecture allows for the performance of tasks on remote servers and a subsequent transfer of the results to the client for presentation.

Figure 3:
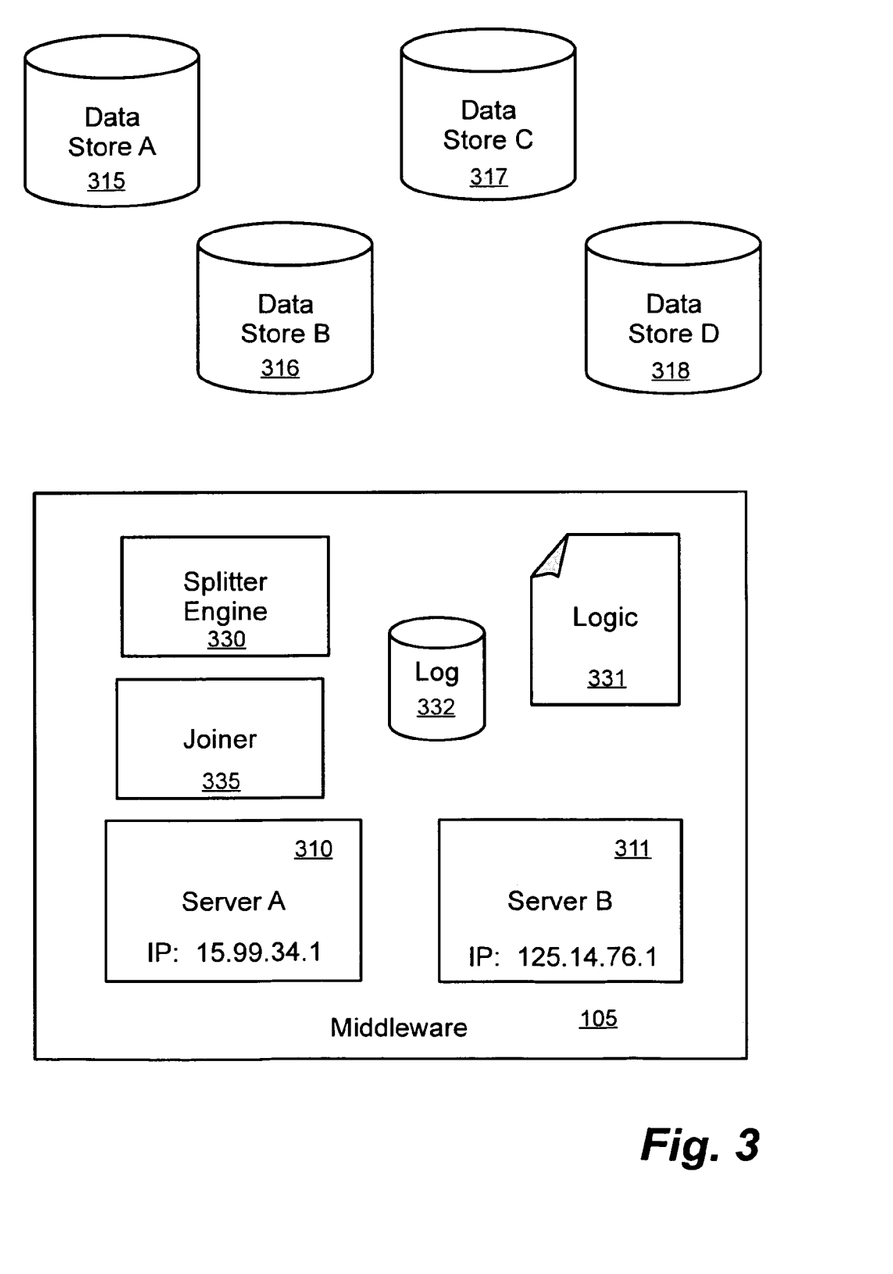
FIG. 3 is a functional block diagram illustrating in greater detail the middleware server introduced in conjunction with FIG. 1.

FIG. 3 is a functional block diagram illustrating additional features of the middleware server 105 introduced in conjunction with FIG. 1. The middleware server 105 includes constituent servers (e.g., server A 310 and server B 311) that are not easily identified as being associated with each other on the network. In other words, constituent servers are selected and configured to prevent hackers or other network eavesdroppers from easily determining that network data traffic directed at the two servers is related. In this particular embodiment, the middleware distinguishes the two or more constituent servers by using Internet Protocol (IP) addresses for which there is sufficient octet diversity that an eavesdropper would not easily determine that the two or more servers are related.

The middleware server 105 is also associated with disparate storage devices (e.g., data store A 315, data store B 316, data store C 317, and data store D 318) on which information can be stored. The several storage devices are located on physically disparate computing systems to achieve data security.

The middleware server 105 includes a splitter engine 330, which is an executable component configured to split data into fragments for separate transmission. The splitter uses logic 331 that defines the manner in which the data should be split. The logic 331 includes rules that are applied by the splitter 330 to specify how the data is to be split, and on which storage device (e.g., data store A-D) each fragment of data is to be stored. Log files 332 are used to keep track of how the data was split, and on which storage device the fragments were in fact stored.

Figure 6:
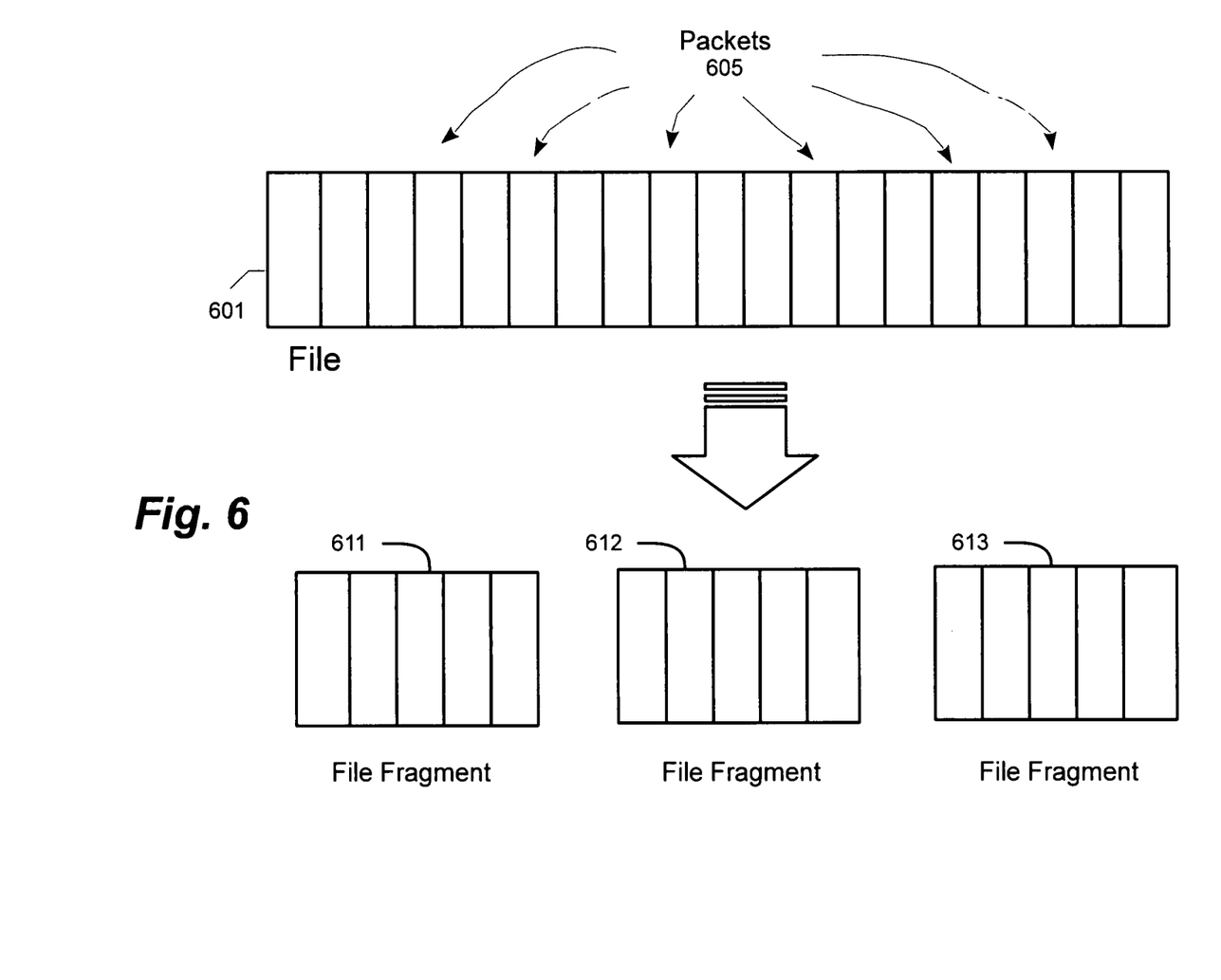
FIG. 6 is a functional block diagram illustrating a data file divided into two or more fragments.

For example, and referring briefly to FIG. 6, data in the form of a computer file 601 (or any other manner of data structure) is illustrated as being composed of a series of packets 605 of information. These packets 605 may take any one or more of various forms, such as bytes of information, streams of data, or any other manner of data description. In its useful state, the file exists as one logical unit. However, the splitter 330 is configured to split the file 601 into fragments (e.g., file fragments 611-613) for separate transmission to disparate data storage devices.

Although illustrated as contiguous data packets, in light of the present disclosure those skilled in the art will appreciate that files physically stored on a storage medium often become fragmented on the same physical disk as part of normal file system operation. The file splitting discussed here does not refer to ordinary file system fragmentation, but rather a deliberate splitting of the file into fragments for the purpose of transmitting the data to the cloud 101, although it is possible in some embodiments that the deliberate splitting of the file could be based on the arbitrary fragmentation due to the file system.

Returning now to FIG. 3, the logic 331 identifies the particular scheme or recipe for splitting data. In one embodiment, the split may be arbitrary, such as by simply splitting the data into a predetermined number of fragments. In another embodiment, the logic 331 may implement a complex set of rules for splitting the data. For instance, if the data is a computer file, such as a word processing file, the logic 331 may establish that the file is split according to a given number of paragraphs or words per fragment. In light of the present disclosure these and other embodiments will become apparent to those skilled in the art.

A joiner 335 is a component used to reconstruct the data by retrieving each of the fragments and reassembling the fragments in the appropriate manner. The joiner 335 also uses the logic 331 and the log files 332 to retrieve and reconstruct the data. In operation, the joiner 335 retrieves the several data fragments from the locations identified in the log files 332, and applies the logic 331 to reassemble the fragments into the original data.

Figure 4:
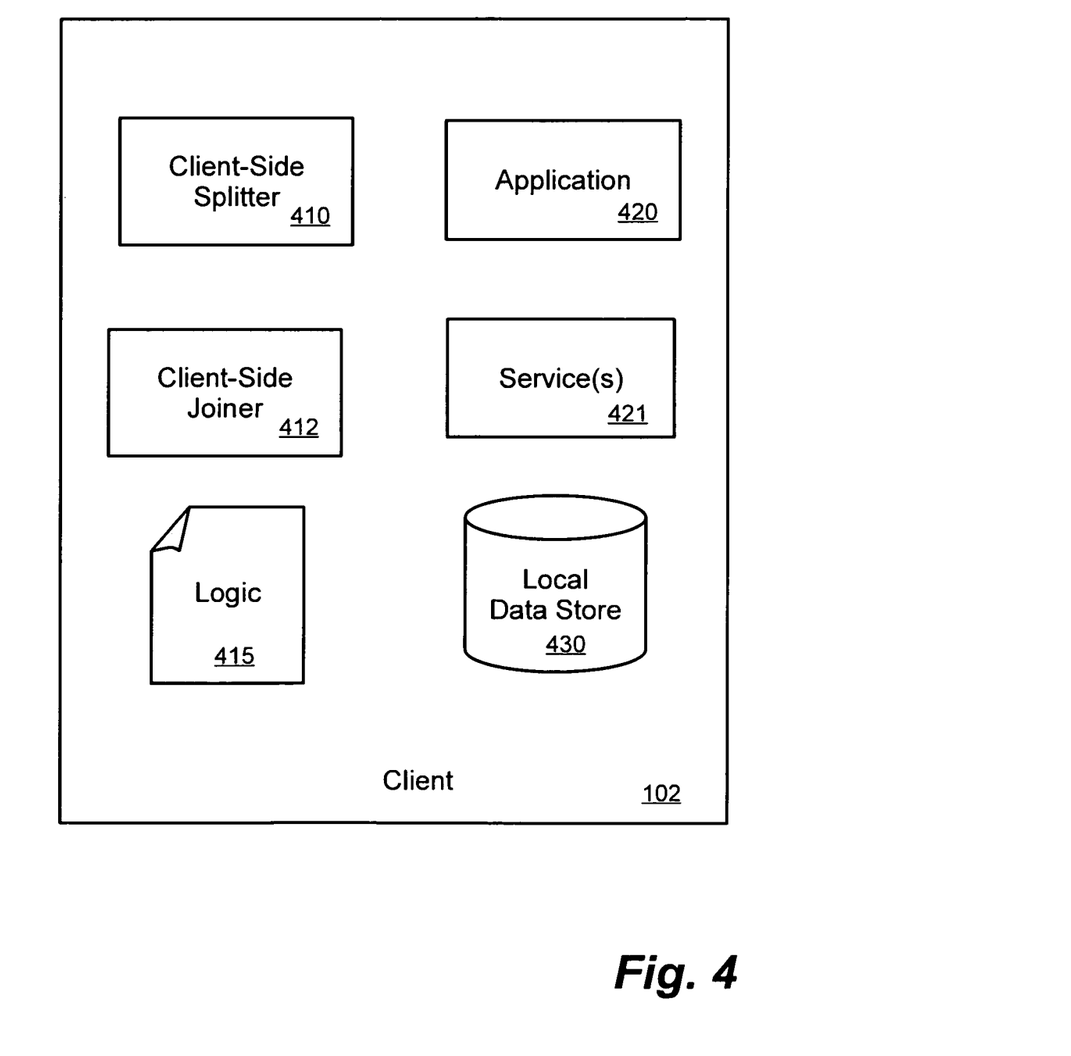
FIG. 4 is a functional block diagram illustrating in greater detail one embodiment of the client computing system introduced in conjunction with FIG. 1.

FIG. 4 is a functional block diagram illustrating in greater detail one embodiment of the client computing system 102 introduced above in conjunction with FIG. 1. As illustrated, the client 102 includes a client-side splitter 410, which operates in largely the same manner as the splitter 330 of the middleware 105. The splitter 410 is responsible for splitting data, such a computer file, into data fragments for transmission to the middleware 105. As with the middleware splitter 330, the client-side splitter 410 splits data based on logic 415, which is similar to the logic 331 used by the middleware 105. The client-side logic 415 should match the middleware logic 331 in sufficient manner so that data can be reconstructed in one device in the same manner as it was split on the other device.

A client-side joiner 412 operates in like manner as the middleware joiner 335. The joiner 412 reassembles data, such as data files, using the logic 415. The client-side splitter 410 and joiner 412 act in concert with the middleware splitter 330 and joiner 335 to split and join the data in a manner that avoids data loss.

An application 420 and/or services 421 are resident on the client 102 and perform tasks. In this example, the application 420 and/or the services 421 represent the components that create and operate on the data that is exchanged with the cloud 101. Examples of the application 420 include an e-mail client, a word processor, a spreadsheet program, a database program, and the like. Examples of the services 421 include an e-mail server architecture, a distributed file system, a security application, and the like. Many other examples will be apparent to those skilled in the art.

The client further includes a local data store 430 for storing data on the client 102. In one example, the local data store 430 may be a hard disk drive, optical disc drive, flash memory, or the like.

Figure 5:
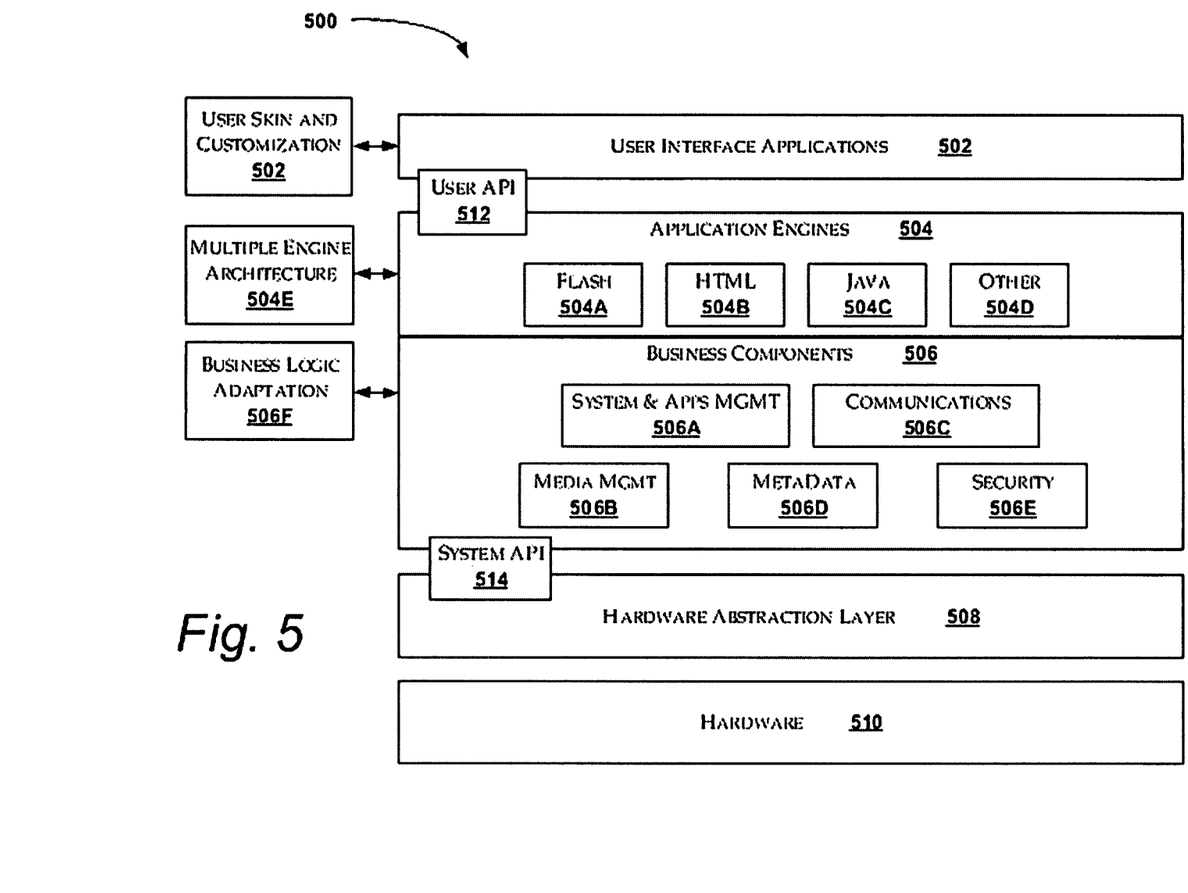
FIG. 5 is another exemplary middleware architecture suitable for use in the secure data communication system shown in FIG. 1.

FIG. 5 is another exemplary middleware architecture 500 suitable for use in the secure data communication system shown in FIG. 1. Exemplary middleware architecture 500 may include components such as user interface application 502, application engines 504, business components 506, a hardware abstraction layer 508, and hardware 510. The user interface application 502 may include user interface skin and other customization 502A. A user application programming interface (API) 512 may link the user interface applications 502 with the application engines 504. The application engines 504 may include multiple engine architectures, such as Flash 504A, HTML 504B, Java 504C, or other languages 504D. The business components 506 may include system and applications management 506A, media management 506B, communications 506C, metadata 506D, and security 506E and may incorporate business logic adaptation 506F. A system application programming interface (API) 514 may link the business components 506 with the hardware abstraction layer 508.

Figure 7:
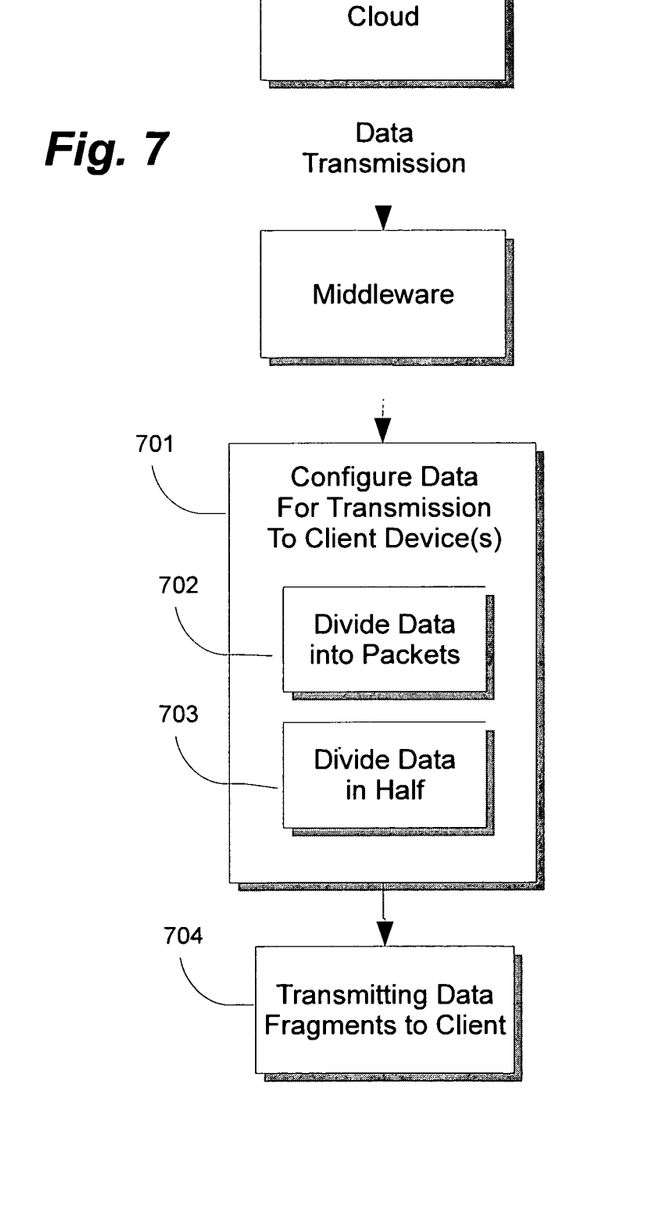
FIG. 7 is an operational flow diagram generally illustrating a process for transmitting data between a client and a cloud computing architecture in such a manner as to ensure data security.

FIG. 7 is an operational flow diagram generally illustrating a process for transmitting data between a client and a cloud computing architecture in such a manner as to ensure data security. In FIG. 7, and in the following figures that include various illustrative embodiments of operational flows, discussion and explanation may be provided with respect to apparatus and methods described herein, and/or with respect to other examples and contexts. The operational flows may also be executed in a variety of other contexts and environments, and or in modified versions of those described herein. In addition, although some of the operational flows are presented in sequence, the various operations may be performed in various repetitions, concurrently, and/or in other orders than those that are illustrated.

FIG. 7 generally illustrates a process that occurs once data is transferred from a cloud resource to the middleware server. The process includes operation 701, at which the middleware server configures the data for one or more client device. Prior to sending the system data reply to the client devices the middleware system goes through a series of steps to protect the data from an interloper or hacker between the middleware solution and the end user.

In this particular implementation, configuring the data (operation 701) may be accomplished in at least two different ways to protect the data from 'man in the middle' attacks. The first way (sub-operation 702) is by physically sending the data package in packetized form, by breaking the data from the whole file into multiple fragments. Alternatively, the data may simply be divided in half (sub-operation 703), without the use of dividing the data further into fragments.

At operation 704, the configured data is transmitted to the client device(s). In this particular embodiment, the configured data is transmitted using more than a single data transmission server. In one implementation, each data fragment is transmitted using a different data transmission server. For example, if the data were divided in half, then two data transmission servers could be used with each data transmission server transmitting a single fragment of the data. In other implementations, more than a single data fragment may be transmitted using the same data transmission server. For example, if the data were divided into thousands of fragments, it may be impractical to attempt to deliver the fragments on a one-to-one basis. In such a case, multiple data transmission servers may be used, with each data transmission server transmitting multiple data fragments.

In this particular implementation, each of the data transmission servers is configured with a unique IP address to eliminate the possibility of an eavesdropper identifying the multiple fragments by correlating the transmissions from multiple related servers. Alternatively, proxy servers may be used to ensure that the data is delivered from unique IP addresses.

Figure 8:
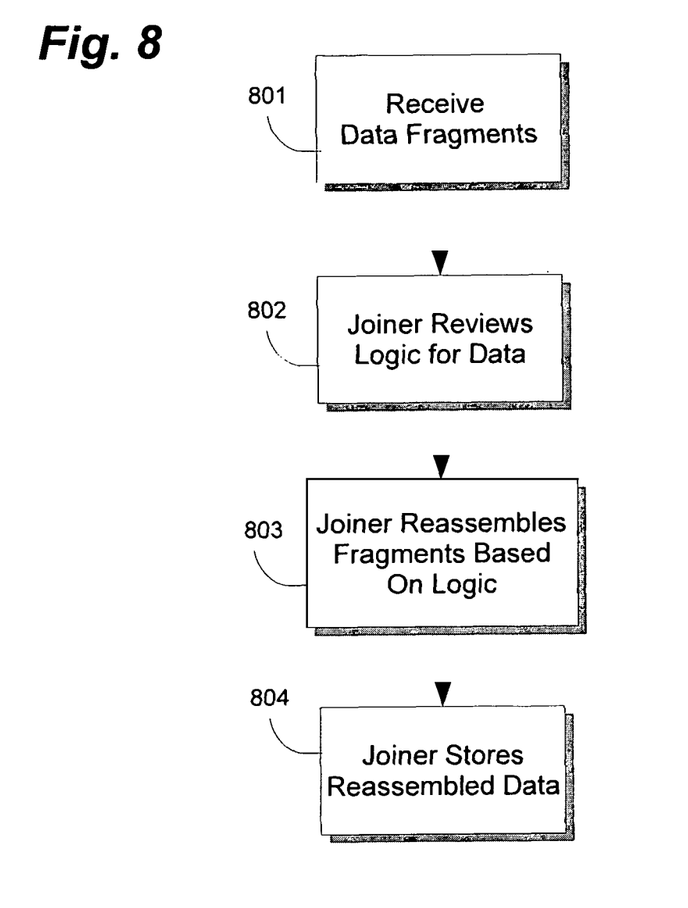
FIG. 8 is another operational flow diagram generally illustrating process for receiving data from a cloud computing architecture in a secure manner.

FIG. 8 is another operational flow diagram generally illustrating process for receiving data from a cloud computing architecture in a secure manner. In this process, a client device has been installed with an appropriate joiner application to identify and assemble fragmented data. The client device receives data fragments (operation 801) from multiple data transmission servers associated with the middleware server described above in conjunction with FIG. 7.

The joiner reviews logic (operation 802) that describes an appropriate method for reassembling the received data. In certain implementations, the data may be received as a file that has been divided in some manner that is particular to the file format. For example, a word processing document may be divided by paragraphs. Each program and/or file type could have its own unique logic for dividing and reassembling the data. In other implementations, the data may be divided into fragments that are unrelated to the type of file format. The logic describes the appropriate reconstruction algorithm or method.

The joiner then reassembles the data fragments (operation 803) based on the particular logic that applies to that data. Again, as just discussed, the data could be divided in some manner consistent with the underlying data format, or it could be divided in some arbitrary (or pseudo-arbitrary) fashion that can be described with a logic or scheme.

Finally, the joiner stores the reassembled data (operation 804). In one particular implementation, the joiner stores the data locally in its reassembled form for use by the client device. In another implementation, the joiner may store the data in a remote location.

Figure 9:
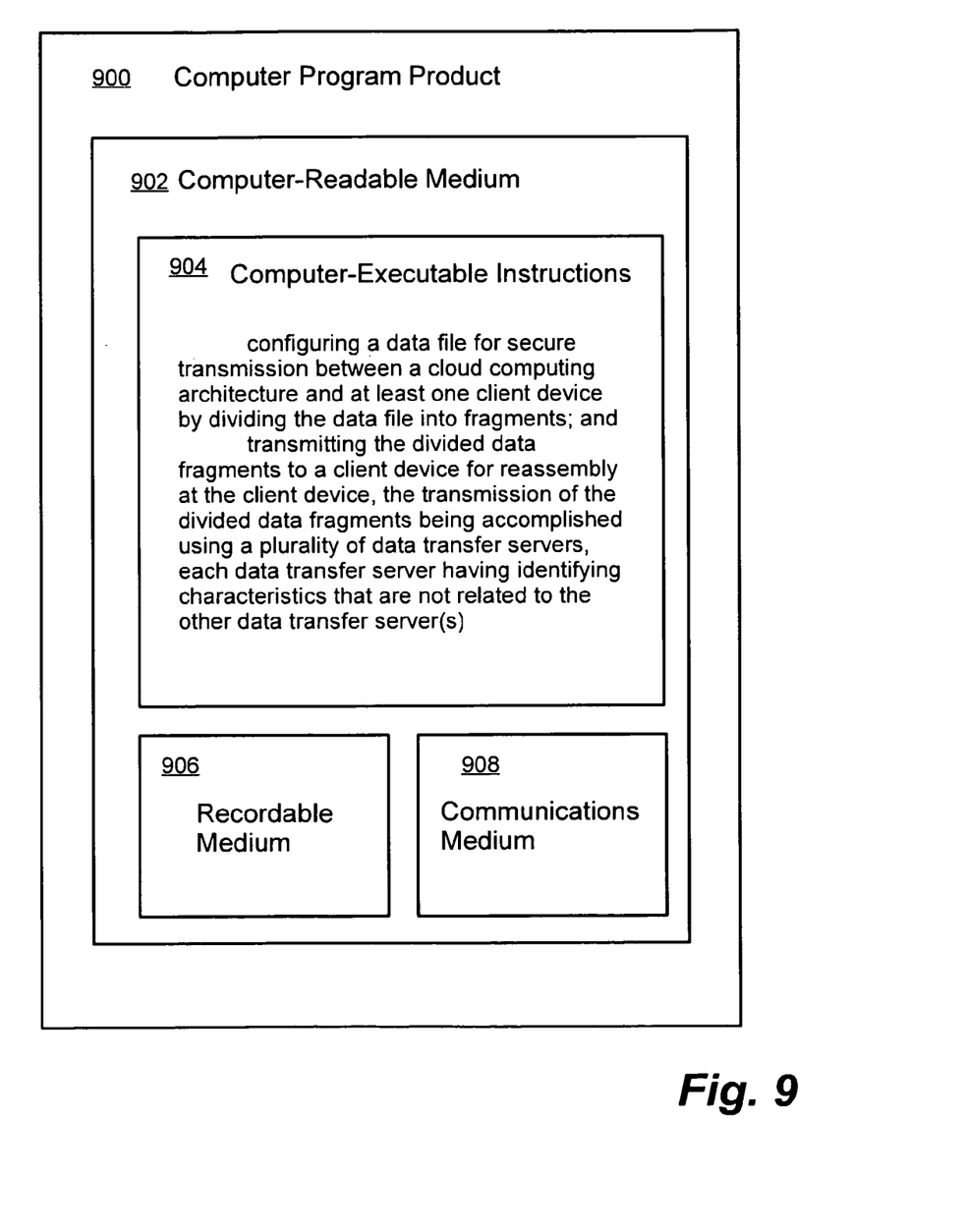
FIG. 9 is a diagram generally illustrating a computer product configured to perform processing for the secure data communication system shown in FIG. 1.

FIG. 9 is a diagram generally illustrating a computer product 900 configured to perform processing for the secure data communication system shown in FIG. 1. The computer program product 900 may take one of several forms, such as a computer-readable medium 902 having computer-executable instructions 904, a recordable medium 906, a communications medium 908, or the like. When the computer-executable instructions 904 are executed, a method is performed. The instructions 904 include, among others, configuring a data file for secure transmission between a cloud computing architecture and at least one client device by dividing the data file into fragments; and transmitting the divided data fragments to a client device for reassembly at the client device, the transmission of the divided data fragments being accomplished using a plurality of data transfer servers, each data transfer server having identifying characteristics that are not related to the other data transfer server(s).

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various embodiments have been disclosed herein, other aspects and embodiments will be apparent to those skilled in art. The various sports and embodiments disclosed herein are for purposes of illustration and are not intended to be limiting, with the true scope and spirit being indicated by the following claims.

What is claimed is:

1. A method for secure data communication, the method comprising:
    configuring a data file for transmission between a cloud computing architecture and at least one client device by dividing the data file into a plurality of fragments and storing the plurality of fragments on a plurality of data transfer servers, wherein each of the data transfer servers is configured to store a respective one of the fragments from among the plurality of fragments, wherein each respective fragment is different from fragments stored in the other data transfer servers, such that when any one of the data transfer servers is unavailable, the client device is unable to reassemble the data file; and
    transmitting the divided data fragments to a client device for reassembly at the client device, the transmission of the divided data fragments being accomplished using the plurality of data transfer servers, each data transfer server having identifying characteristics that are not related to the other data transfer server(s).

2. The method recited in claim 1, wherein configuring the data file comprises dividing the data file into two pieces.

3. The method recited in claim 1, wherein each of the plurality of fragments is stored on a different data transfer server.

4. The method recited in claim 1, wherein the identifying characteristics of the data transfer servers comprises an Internet Protocol (IP) address for each data transfer server, and wherein each data transfer server has an IP address that is unrelated to the IP addresses of the other data transfer servers.

5. The method recited in claim 4, wherein proxy servers are used to provide the different IP addresses for each data transfer server.

6. The method recited in claim 1, wherein the data file is divided into fragments based on an underlying file format of the data file.

7. The method recited in claim 1, wherein transmitting the divided data fragments comprises transmitting a single data fragment over each of a plurality of data transfer servers such that each data transfer server transmits one of the divided data fragments.

8. The method recited in claim 1, wherein configuring the data file further comprises dividing the data file into fragments using a splitter component that is compatible with a joiner component such that the joiner component is operative to reassemble data fragments divided by the splitter component.

9. The method recited in claim 1, wherein the splitter component is resident at a middleware server and the joiner component is resident at the client device.

10. The method recited in claim 1, wherein the splitter component is resident at the client device and the joiner component is resident at a middleware server.

11. A non-transitory computer-readable medium encoded with computer-executable instructions for secure data communication, the instructions comprising:
configuring a data file for transmission between a cloud computing architecture and at least one client device by dividing the data file into a plurality of fragments; and
transmitting the divided data plurality of fragments to a client device for reassembly at the client device, the transmission of the divided plurality of fragments being accomplished using a plurality of data transfer servers, each data transfer server having identifying characteristics that are not related to the other data transfer server(s) and each data transfer server configured to store a respective one of the fragments from among the plurality of fragments, wherein each respective fragment is different from fragments stored in the other data transfer servers, such that when any one of the data transfer servers is unavailable, the client device is unable to reassemble the data file.

12. The non-transitory computer-readable medium recited in claim 11, wherein configuring the data file comprises dividing the data file into two pieces.

13. The non-transitory computer-readable medium recited in claim 11, wherein each of the plurality of fragments is stored on a different data transfer server.

14. The non-transitory computer-readable medium recited in claim 11, wherein the identifying characteristics of the data transfer servers comprises an Internet Protocol (IP) address for each data transfer server, and wherein each data transfer server has an IP address that is unrelated to the IP addresses of the other data transfer servers.

15. The non-transitory computer-readable medium recited in claim 14, wherein proxy servers are used to provide the different IP addresses for each data transfer server.

16. The non-transitory computer-readable medium recited in claim 11, wherein the data file is divided into fragments based on an underlying file format of the data file.

17. The non-transitory computer-readable medium recited in claim 11, wherein transmitting the divided data fragments comprises transmitting a single data fragment over each of a plurality of data transfer servers such that each data transfer server transmits one of the divided data fragments.

18. The non-transitory computer-readable medium recited in claim 11, wherein configuring the data file further comprises dividing the data file into fragments using a splitter component that is compatible with a joiner component such that the joiner component is operative to reassemble data fragments divided by the splitter component.

19. The non-transitory computer-readable medium recited in claim 11, wherein the splitter component is resident at a middleware server and the joiner component is resident at the client device.

20. The non-transitory computer-readable medium recited in claim 11, wherein the splitter component is resident at the client device and the joiner component is resident at a middleware server.

* * * * *